United States Patent
Clarke (10) Patent No.: US 6,287,494 B1
(45) Date of Patent: Sep. 11, 2001

(54) GAS INTRODUCTION

(75) Inventor: Peter Reginald Clarke, Petworth (GB)

(73) Assignee: Coraltech Limited, Petersfield (GB)

( * ) Notice: Subject to any disclaimer, the term of this patent is extended or adjusted under 35 U.S.C. 154(b) by 0 days.

(21) Appl. No.: 09/402,286

(22) PCT Filed: Apr. 2, 1998

(86) PCT No.: PCT/GB98/00865

§ 371 Date: Oct. 1, 1999

§ 102(e) Date: Oct. 1, 1999

(87) PCT Pub. No.: WO98/43798

PCT Pub. Date: Oct. 8, 1998

Related U.S. Application Data (60) Provisional application No. 60/063,480, filed on Oct. 17, 1997.

(30) Foreign Application Priority Data

Apr. 2, 1997 (GB) .................................. 9706682

(51) Int. Cl.⁷ ................................................ B29C 44/02
(52) U.S. Cl. ................................. 264/50; 264/51; 264/53
(58) Field of Search ................................. 264/50, 51, 53; 425/145

(56) References Cited

U.S. PATENT DOCUMENTS

| | | | |
|---|---|---|---|
| 3,436,446 | * | 4/1969 | Angell, Jr. .............................. 264/50 |
| 3,697,204 | * | 10/1972 | Kyritsis et al. ........................ 264/48 |
| 3,719,441 | * | 3/1973 | Spaak et al. ........................... 264/51 |
| 3,746,492 | * | 7/1973 | DeVita .................................. 425/543 |
| 3,751,534 | * | 8/1973 | Oxley .................................. 264/45.2 |
| 4,043,715 | * | 8/1977 | Hendry .................................. 264/50 |
| 4,135,870 | * | 1/1979 | Wallace et al. ...................... 425/130 |
| 4,155,969 | * | 5/1979 | Hendry .................................. 264/50 |
| 4,255,368 | * | 3/1981 | Olabisi .................................. 264/50 |
| 4,390,332 | * | 6/1983 | Hendry .................................. 264/50 |
| 4,426,427 | * | 1/1984 | Vieth et al. ............................ 264/50 |
| 5,056,997 | * | 10/1991 | Hayashi et al. ...................... 425/130 |
| 5,124,095 | * | 6/1992 | Gianni et al. .......................... 264/50 |

FOREIGN PATENT DOCUMENTS

| | | | |
|---|---|---|---|
| 2 064 414 | * | 6/1981 | (GB) ...................................... 264/50 |
| 52-2423 | * | 1/1977 | (JP) ....................................... 264/50 |

* cited by examiner

Primary Examiner—Allan R. Kuhns
(74) Attorney, Agent, or Firm—Ware, Fressola, Van Der Sluys & Adolphson LLP (57) ABSTRACT

The cylinder head (8) of an injection molding machine has a transverse bore (20), in which is threadedly engaged a gas introduction device (21) connected to a gas bottle (22), having a pressure regulator (23). The device has a body (24) which carries a valve poppet (25) in a complementarily shaped bore (26) opening to the passage through the cylinder head. A spring (27) normally closes the poppet valve. A control valve (28), under control of the system (7) is provided upstream of the poppet valve. Gas is introduced into the injection chamber of the machine after suck back and before screw rotate for feeding plastics material to the injection chamber. On injection, the material is injected with the gas added to it.

37 Claims, 5 Drawing Sheets

GAS INTRODUCTION

This application claims the benefit of U.S. Provisional Application No. 60/063,480, filed Oct. 17, 1997.

The present invention relates to a method of introducing gas into molten plastics prior to injection of the material into a mould for forming an article.

In conventional injection moulding, the molten plastics material is injected into a mould, where it solidifies and the mould is opened for ejection of the formed article. Cinpres Limited has proposed, in various patents for example WO 93/23228, to inject gas into the mould via a nozzle simultaneously or after the plastics material to provide voids in the formed article, thus economising on the amount of plastics material used. A similar effect had previously been obtained by injection of a blowing agent with the plastics material as described for instance in GB 2 010 168 A. In this case the blowing agent is one which decomposes at a given high temperature to release nitrogen gas. The decomposition reaction is an exothermic reaction and so this type of blowing agent is known as an exothermic blowing agent.

There is a second type of blowing agent, known as an endothermic blowing agent. These blowing agents rely on a chemical reaction to liberate carbon dioxide, or an other gas, which then dissolves in the molten plastics material. As the gas comes out of solution an endothermic effect occurs in the plastics material. This has the added advantage of cooling the moulded article, which improves the mould cycle time.

In my International Patent Application No. PCT/GB96/01706, I have described use of a blowing agent to foam thick areas of an article, to a thickness greater than that given by the mould part gap, on complete or partial opening of the mould. Further in my UK patent application No. 9624162.5, I have described similar use to foam substantially all of an article to substantially circular cross-section.

The object of the present invention is to provide a method of introducing gas, to act as a blowing agent, which relies neither on a chemical blowing agent nor on injecting the gas via a nozzle directly into the mould. Rather it relies on addition of the gas to the molten plastics material in the injection moulding machine, or in a mould in the machine upstream of the mould's gate or point of injection of molten plastics material into the mould cavity. The gas is mixed with and will usually dissolve into the material and be injected into the mould cavity with the plastics material.

According to the invention there is provided a method of adding gas to molten plastics material during each cycle of an injection moulding machine with an internal space limited by a piston, the method consisting in the steps of:

introducing gas into the space in front of the piston on backwards movement of the piston, feeding molten plastics material to the space and applying injection pressure to the space via the piston for expulsion therefrom of the molten plastics material with the added gas and its injection into a moulding cavity.

Preferably, the gas is of a substance which is gaseous at ambient pressure and temperature and is preferably carbon dioxide. Hydrocarbon or other gases may also be suitable. Further, it is envisaged that the gas could of a substance which is liquid at ambient pressure and temperature, but gaseous at the elevated temperature of molten plastics material, such as water.

In one embodiment, the injection moulding machine has a plasticising screw which is not adapted to reciprocate and a shooting pot having an injection piston adapted to reciprocate in an injection chamber. In another embodiment, the injection moulding machine has a plasticising screw which is adapted to reciprocate in an injection chamber. In both these embodiments, the gas is introduced into the injection chamber during each cycle of the machine.

Normally, the injection pressure is reduced after injection to a holding pressure before the mould cavity is opened and the pressure in the injection chamber is reduced below the holding pressure for introduction of the gas into the injection chamber. Additionally it is likely that the gas will be introduced during or subsequent to decompression or suckback, following injection and application of holding pressure.

Two alternative methods are envisaged for actual introduction of the gas. For both, the gas is initially at elevated pressure. In the first alternative, on introduction the gas drives the injection piston or plasticising screw back by a controlled amount due to the elevated pressure. In the second alternative, the injection piston or plasticising screw is drawn back by a controlled amount, by the machine's mechanism for reciprocating the piston or screw, whereby a controlled amount of gas is introduced into the injection chamber. In both alternatives, a controlled amount of gas is introduced into the injection chamber. Further, in both alternatives, the gas can be introduced at its storage pressure or at a lower pressure to which the gas is reduced by a regulator. Preferably, the pressure is lowered for the second alternative, whereby the amount of gas introduced can be closely controlled. It should be noted that ability to introduce the gas at storage pressure or lower is a significant advantage, both in terms of ease of metering and the avoidance of the need for a pump.

Conveniently, the stroke by which the injection piston or plasticising screw is driven or drawn back is at least partially taken up again after gas introduction by application of back pressure. This compresses the gas into a fraction of its original volume and begins to urge it into solution in the plastics material. The back pressure is then maintained during wind back and feed of the plastics material into the chamber. During this step, the plastics material is mixed with the gas by formations on the front of the screw.

The gas can be introduced directly into the injection chamber to the side of a cylinder head of the injection chamber remote from the moulding cavity. Alternatively, the gas can be introduced to the injection space via the cylinder head or a nozzle between the cylinder head and a mould tool incorporating the moulding cavity. It is also conceivable that the gas could be introduced axially of the plasticising screw. In another alternative, the gas can be introduced to the injection space via a flow channel in a mould tool incorporating the moulding cavity.

Where the gas is introduced axially of the screw, it is conceivable that it might be introduced intermittently during wind back and/or at the end of wind back. Such introduction would be to differing parts of the melt, with a view to distributing the gas in the charge of gas and melt.

After charging of the chamber, the back pressure is preferably increased to a higher pressure, with the shut-off valve still closed, to aid dissolution of the gas in the melt.

Either the cylinder head can have a shut-off valve or the mould tool can have a mechanical shut-off gate. In either case, the valve or the gate is preferably closed during gas introduction.

Preferably the gas and the melt are mixed or further mixed during injection by passage through a mixer.

Two devices are envisaged for introduction of the gas, namely a non-return poppet valve, opening into the injection chamber, or the cylinder head, or the nozzle, or a flow channel in a mould tool, and a control valve between the poppet valve and a source of gas. The other device is a controllable inlet valve, opening into the injection chamber, or the cylinder head, or the nozzle, or a flow channel in a mould tool. The controllable inlet valve can obturate the cylinder head or the nozzle or the flow channel in a mould tool when open.

According to another aspect of the invention there is provided an injection moulding machine for performing the method of the invention, the machine having a control system incorporating an auxiliary output adapted and arranged to actuate means for introducing gas into the space in front of the piston on backwards movement of the piston.

The gas introduction means can be incorporated with the machine and comprises:

a source of gas at elevated pressure, preferably having a pressure regulator, a control valve connected to the source of gas for controlling flow therefrom, the valve being controlled by the auxiliary output and a non-return poppet valve connected to the control valve, the non-return poppet valve being mounted in a wall of the injection chamber, the cylinder head or the nozzle of the machine and arranged to admit gas to the injection chamber when the control valve is open and the gas pressure is sufficient to overcome the opening resistance of the poppet valve.

Alternatively, the gas introduction means can comprise:

a source of gas at elevated pressure, preferably having a pressure regulator, and an controllable inlet valve connected to the source of gas for controlling flow therefrom, opening of the valve being controllable by the auxiliary output, the valve being mounted in a wall of the injection chamber, the cylinder head or the nozzle of the machine and arranged to admit gas to the injection chamber.

Preferably the injection moulding machine includes a plasticising screw ring valve adapted to remain closed when drawn back. This has the advantage of enabling gas to be drawn into the injection chamber without plastics material flowing past the ring valve into the space intended to be filled with gas.

In the preferred embodiment, one of the ring and a nose piece of the screw has:

at least one L-shaped groove, the long limb of the L being substantially aligned with the screw and the short limb being set at a shallow screw angle, and the other of the ring, and the nose piece has a corresponding number of pins engaging in the groove (s);

the arrangement being such that:

on injection the plastics material in front of the ring valve causes the pin(s) to travel along the short limb(s) away from the long limb(s) to allow the valve to close, on gas introduction, particularly when the screw is drawn back, the ring valve remains closed and on wind back of the screw to feed plastics material, drag between the barrel of the screw and ring valve causes the pin(s) to travel back along the short limb(s) and into the long limb(s) to allow the valve to open and the plastics material to flow past the valve.

As an alternative to the gas introduction means being incorporated with the machine, it can be incorporated with the mould which then in combination with the machine comprises:

a source of gas at elevated pressure, preferably having a pressure regulator, a control valve connected to the source of gas for controlling flow therefrom, the valve being controlled by the auxiliary output and a non-return poppet valve connected to the control valve, the non-return poppet valve being mounted in a wall of a flow passage of the mould tool and arranged to admit gas to the injection chamber when the control valve is open and the gas pressure is sufficient to overcome the opening resistance of the poppet valve.

Alternatively the combination can comprise:

a source of gas at elevated pressure, preferably having a pressure regulator, and an controllable inlet valve connected to the source of gas for controlling flow therefrom, opening of the valve being controllable by the auxiliary output, the valve being mounted in a wall of a flow passage of the mould tool and arranged to admit gas to the injection chamber.

According to a third aspect of the invention there is provided the tool of the above combinations.

The method of the invention may be incorporated in a method of forming a moulded article as described in my International Patent Application No. PCT/GB96/01706 or my UK patent application No. 9624162.5. Alternatively, the gas dissolved in the plastics material may be used to blow the article to fully fill the mould tool either to economise on use of the plastics material or to avoid shrinkage marks in the finished moulding, without alteration of the shape of the mould tool or the article after opening of the mould. Further, the gas dissolved in the plastics material may be used merely to ease release of the moulding from the mould tool, allowing shallower draft angles to be used. The addition of gas to the melt may be utilised merely to provide internal cooling of the injected melt—the gas taking up latent heat in vaporising from the formed article.

BRIEF DESCRIPTION OF THE DRAWINGS

To help understanding of the invention, various specific embodiments thereof will now be described by way of example and with reference to the accompanying drawings, in which:

FIGS. 4(*a*) to 4(*e*) show diagrammatically the position of the plasticising screw, shut-off valve and gas introduction valve sequentially through the machine's injection cycle;

FIGS. 7(*a*) & 7(*b*) are side views of a special ring valve for the moulding machine of FIG. 1.

DETAILED DESCRIPTION OF THE DRAWINGS

Figure 1:
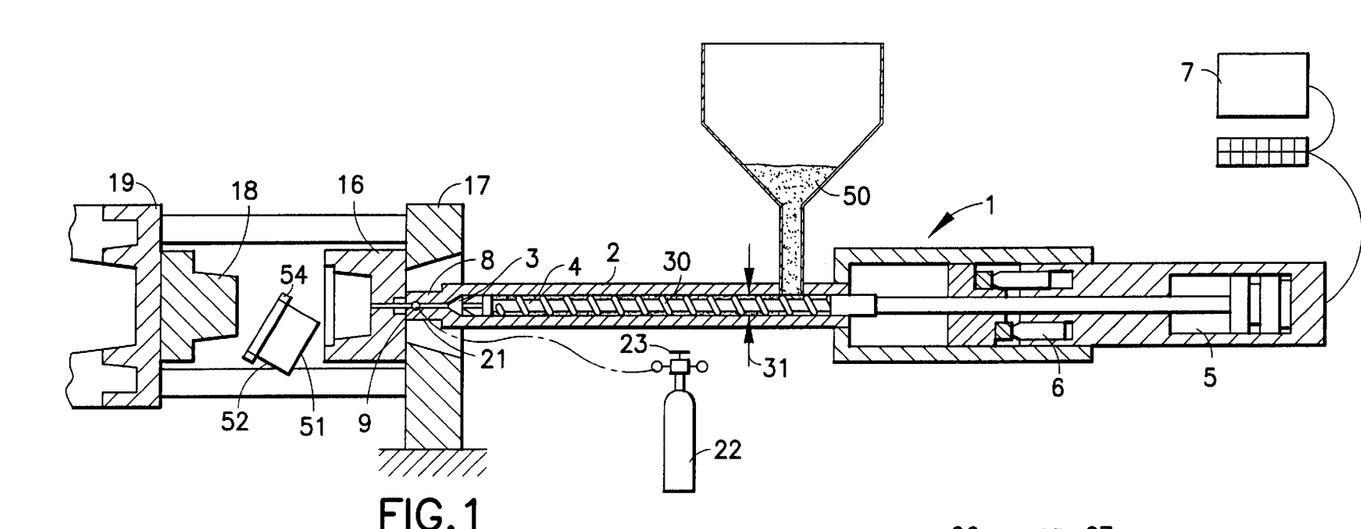
FIG. 1 is a diagrammatic, cross-sectional side view of a reciprocating screw injection moulding machine adapted to perform the method of the invention.

Referring initially to FIGS. 1 to 4, the reciprocating screw moulding machine 1 shown in FIG. 1 has a cylinder 2 defining an injection chamber 3, in which is arranged a plasticising screw 4. The screw is reciprocatingly movable by an injection piston-and-cylinder unit 5 and connected to a rotational drive unit 6. The units 5,6 and the entire machine are controlled by a computerised control system 7.

Figure 2:
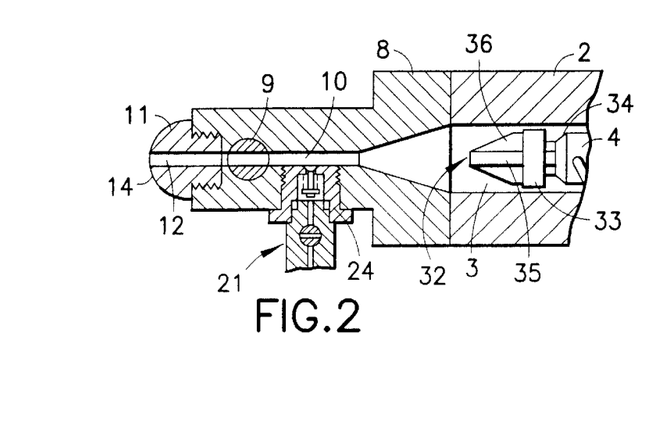
FIG. 2 is a similar view on a larger scale of the injection nozzle, cylinder head and front end of the plasticising screw, when advanced in the injection chamber, of the machine of FIG. 1.

To the forward end of the cylinder 2, a cylinder head 8 is bolted. It incorporates a shut-off valve 9—under control of the system 7—for closing a through bore 10. An injection nozzle 11 is threadedly connected to the cylinder head with its bore 12 continuing the bore 10. The forward end 14 of the nozzle is domed and engages a complementary recess in a cavity part 16 of a two part mould tool. The mould tool cavity is carried on a stationary platen 17 of the machine, whilst a core part 18 is carried on a moving platen 19.

Figure 3:
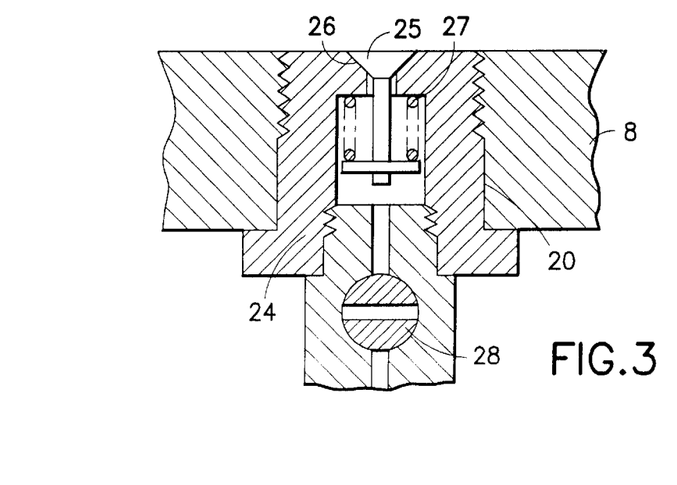
FIG. 3 is a similar view on a yet larger scale of a gas introduction device.

The cylinder head 8 has a transverse bore 20, in which is threadedly engaged a gas introduction device 21 connected to a gas bottle 22, having a pressure regulator 23. The device has a body 24 which carries a valve poppet 25 in a complementarily shaped bore 26 opening to the passage through the cylinder head. A spring 27 normally closes the poppet valve. A control valve 28, under control of the system 7, is provided upstream of the poppet valve.

Figure 7A:
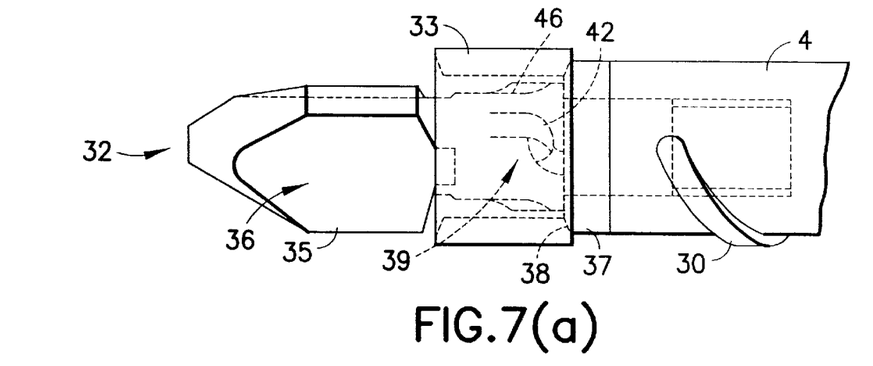
Figure 7B:
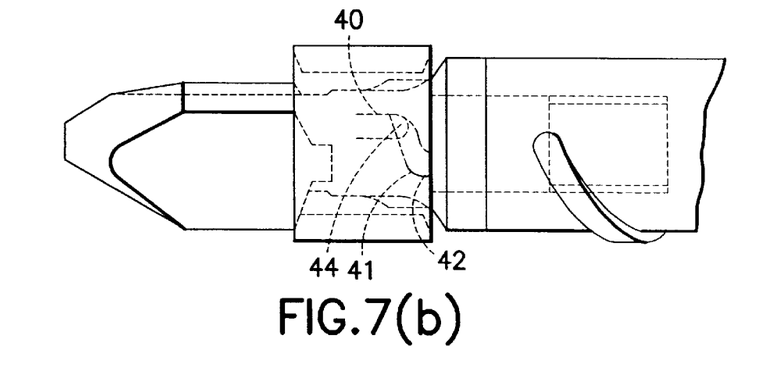
Figure 8:
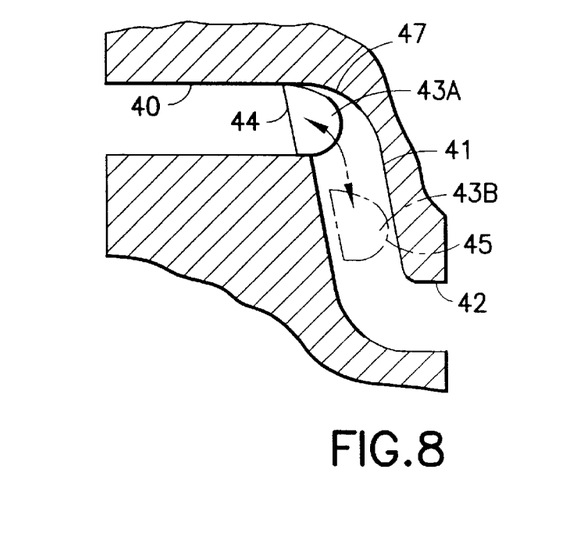
FIG. 8 is a diagram of operation of the ring valve.

The plasticising screw 4 is conventional, having a thread 30 with a root diameter 31 increasing towards the nose end of the screw. The latter has a nose piece 32 carrying a shuttle valve ring 33. On forwards movement of the screw, the ring moves against a seat 34 acting to seal plastics material in front of it. On return movement of the screw, the ring moves against nose fins 35, between which slots 36 are provided to allow the material to flow forwards. Referring to FIGS. 7(a), 7(b) & 8, the ring valve has an adaptation to allow it to remain closed when the screw is drawn back. The nose piece 32, between the fins 35 and a chamfered disc 37, against which the ring 33 seals at a complementary chamfer 38, has a portion within the ring which has three L-shaped grooves 39 cut in it. The grooves have a long limb 40 aligned with the longitudinal axis of the screw and a short limb 41 aligned at a shallow screw angle transversely to the long limb 40. The screw angle of the short limb is shallower than that of the plasticising screw, but of the same hand. Although not used in operation, to enable assembly as described below, the grooves have another end limb 42 parallel to the long limb. The ring has three inwardly projecting pins 43, which engage in the grooves. The front face 44 of the pins is angled at the same angle as the screw angle of the short limbs; whilst the rear face 45 is curved. The nose piece is threadedly attached to the screw as such. Before assembly thereto, the ring is added, by passing the pins 43 into the auxiliary limbs 42, and on via the short L limbs 41 to the long L limbs 40. The ring is stopped by contact with the fins 35. In this position further grooves 46 allow plastics material to flow through the ring. The nose piece can now be assembled to the screw, with the interposition of the chamfered disc 37.

Whilst operation of the machine per se will be described below, it is convenient to describe the operation of the ring valve here. From the position just described of the pins in the long limbs—see 43A in FIG. 8—on feeding of the plastics material be the screw, they move back with the ring when the injection pressure is applied. The material exerts considerable force on the front of the ring such that although the screw angle of the short limbs is shallow, the ring moves back and turns so that the pins enter the short limbs—see 43B in FIG. 8. The ring seals against the disc 36. The turning of the ring is helped by the corner 47 between the limbs being initially steeply angled (in the sense of a screw thread). After injection, withdrawal of the screw with turning of the screw causes the ring to stay closed. Thus, gas can be drawn in as described below. On rotation of the screw, the ring is initially dragged by the barrel of the screw so that it turns with respect to the nose piece and the pins move to the corner of the Ls. Feeding of the material pushes the ring forward and the pins move into the long limbs, the starting point referred to at the beginning of this paragraph.

Figure 4A:
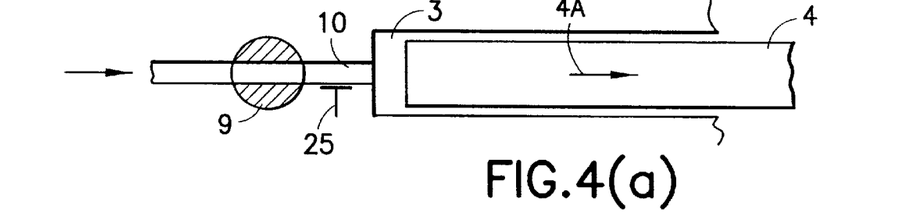
Figure 4B:
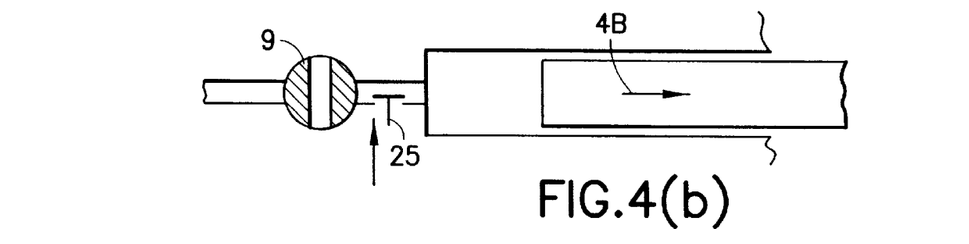
Figure 4C:
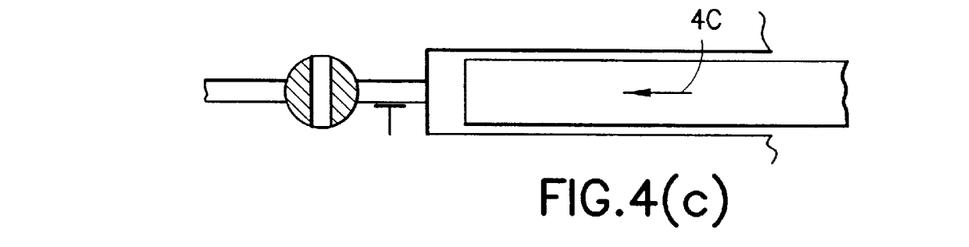
Figure 4D:
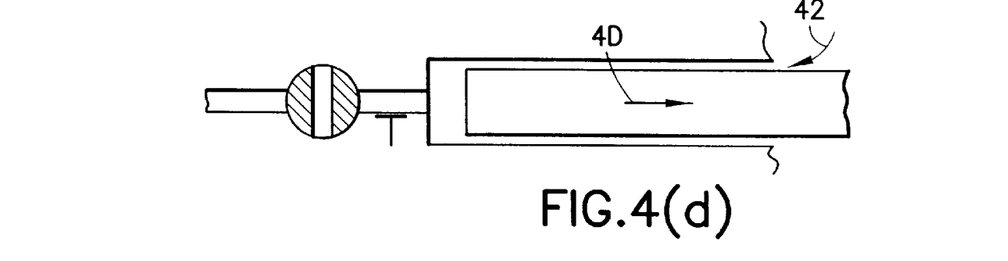
Figure 4E:
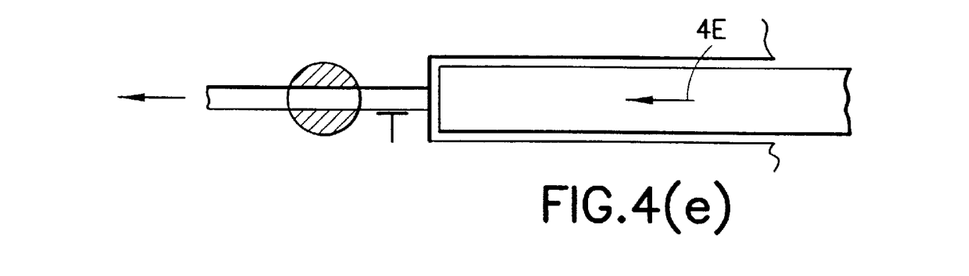

Operation of the machine will now be described with particular reference to FIGS. 4(a) to 4(e):

After mould opening, decompression of the plastics material in the injection chamber 3 and the bores 10,12 and initial pull-back of the plasticising screw 4—see arrow 4A in FIG. 4(a)—the shut-off valve 9 in the cylinder head 8 is closed and the gas control valve 28 is opened, which admits gas pressure behind the poppet valve 25, which opens. Two alternatives are now available. Either, the screw can be driven back by the pressure of the gas from the bottle 22 as regulated 23, on release of the hydraulic pressure in the piston-and-cylinder unit 5. The movement—see arrow 4B in FIG. 4(b)—and hence the quantity of gas entering the injection chamber can be controlled by stopping the movement with the unit 5. Alternatively, and particularly where a smaller, precisely controlled amount of gas is required to be admitted, it can be regulated to a lower pressure and the screw pulled back by a desired amount—again arrow 4B. The gas control valve 28 is then closed and the poppet valve 25 closes. The result is that the injection chamber is filled with gas in front of the screw. A typical gas pressure, when the gas is carbon dioxide, is 30 to 50 bar. This pressure will drive the screw back on the BMB moulding machine, from BMB SpA of Brescia in Italy, on which we have carried out our development work. Gas can be introduced at lower pressure by drawing back the screw. If too low a pressure is used, the poppet valve may not open reliably against the resistance of plastics material in front of it. In our prototype it is small, having a diameter of 6 mm. For lower pressures, it may be more satisfactory to use in the cylinder head the positively controlled gas inlet valve described below in respect of FIG. 5.

Next, back pressure is applied by the injection piston and cylinder unit 5 to maintain a pressure of the order of 50 bar in the injection chamber. Where the gas pressure is significantly lower than the back pressure, the screw will move forwards as the gas is compressed—see arrow 4C in FIG. 4(c). Rotational drive is then applied to the screw, feeding plastics material 50 past along the screw, past the shuttle valve 33. The nose fins 35 act to stir the material and mix it with the gas. The latter progressively dissolves in the plastics material.

Wind back of the screw continues against the back pressure which may be held constant or varied, with the plastics material being fed into the chamber until the required amount for the next injection operation is present. During wind back, the material mixes with the gas, which continues to dissolve, and the screw moves back—see arrow 4D in FIG. 4(d). After wind back, the back pressure is increased to a dissolution pressure of the order of 200 bar, although it is anticipated that a dissolution pressure of between 50 and 500 bar may be effective. This pressure is maintained for a short time (which is variable according to application). Then the cylinder head valve is opened and the material is injected into the mould, with an increase in pressure to the injection pressure of the order of 1500 bar—see arrow 4E in FIG. 4(e).

On injection, in accordance with the invention of my International Patent Application No. PCT/GB96/01706, the time to mould opening is controlled to cause solidification of the plastics material in the portions of the mould void corresponding to thin wall portions of the finish formed article, namely the base 51 and side wall 52, whilst the material in the thick wall portions, namely the rim 54 of the moulding, remains centrally liquid, although skinned with solidified material. On mould opening, the restraint on these portions is released, the gas comes out of solution foaming the still liquid material and the cross-section is inflated, stiffening the article. The injection pressure can be controlled to not completely pack the mould, or at least not to pack it at high pressure, particularly in the thin wall portions, whereby some bubble formation can occur in the thin wall portions before these portions completely solidify (which solidification is necessary before mould opening to avoid post opening foaming in the thin wall portions). This bubble formation is advantageous in allowing a weight reduction in the article, in comparison with bubble-less articles with the same wall thickness.

The method of the invention is not restricted being used in conjunction with the invention of my International Patent Application No. PCT/GB96/01706. It may be used in the formation of articles having a uniform wall thickness or indeed differing wall thicknesses, to allow introduction of gas into the melt, such that bubble formation occurs in the moulded article after injection and before mould opening.

Further, both in conjunction with the invention of my International Patent Application No. PCT/GB96/01706 and without it, migration of the gas to the surface of the moulding can assist in separation of the article from the mould. Particularly, this is useful in reducing the conventional draft angle necessary.

Figure 5:
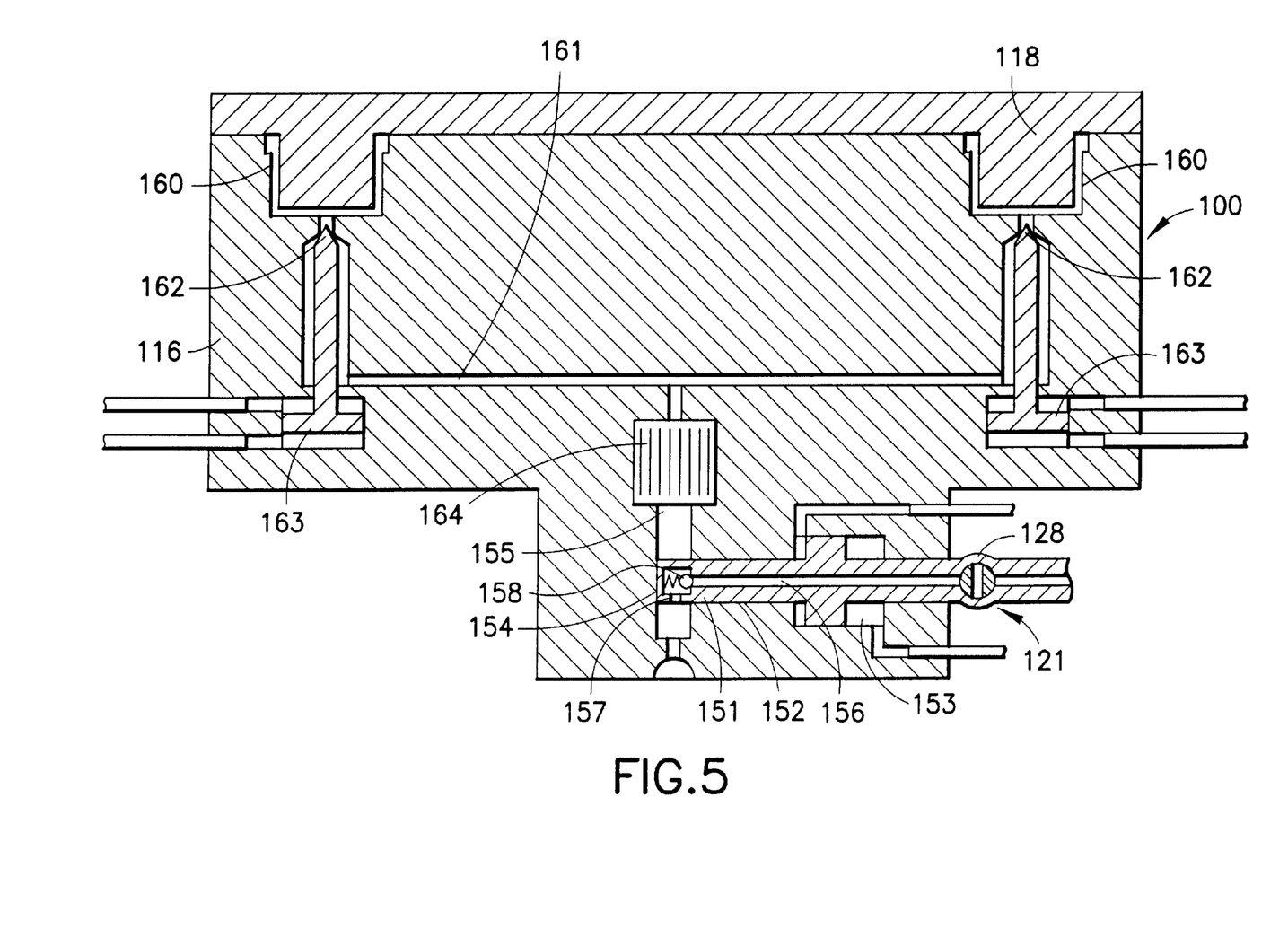
FIG. 5 is a diagrammatic cross-sectional view of a mould tool for use in the invention.

Turning now to FIG. 5, a mould tool 100 adapted for the invention is there shown. It has a cavity part 116 and a core part 118 and is intended to be used in a conventional moulding machine, utilising auxiliary control outputs for controlling the gas introduction device 121 to operate at appropriate points in the machine's injection cycle. The device has a gas control valve 128 controlled by one auxiliary control. In place of the poppet valve of the device 21, it has a gas introduction pin 151, which is carried in a bore 152 in the cavity part 116. The pin is movable by a pneumatic actuator 153 controlled by another auxiliary control. In its withdrawn position, the distal end 154 of the pin is withdrawn into the bore 152. In its advanced position, the pin extends across the flow channel 155 for the plastics material through the cavity part 116. The end of the pin is domed so that it can completely close off the flow channel and direct gas from it back towards the injection chamber of the injection moulding machine. The pin has an axial bore 156 for the gas, which leaves it via an orifice 157. Within the orifice, at the end of the bore 156, a non-return valve 158 is arranged. This ensures that should any plastics material permeate the bore 152 when withdrawn, it cannot enter and block the bore 156.

In operation, after suck back, before the cylinder head shut off valve is closed, the pin is advanced. The gas control valve 128 is opened and the plasticising screw is either blown back by the pressure of the introduced gas or withdrawn to allow the gas to flow in. Once sufficient gas has entered the injection chamber, the pin is withdrawn and the shut-off valve is closed. The plastics material is fed as described above. Injection is timed to allow for the fact that the tool has two impressions 160, fed by a hot runner 161 and mechanical shut off gates 162 operated by pneumatic actuators 163. Also incorporated is a melt mixer 164. Thus the cylinder head shut off valve is opened after screw rotate and the entire flow channel and hot runner pressurised to injection pressure. This causes any gas in the flow channel to pass into solution. When the gates are opened, the melt passes through the mixer rendering it more homogeneous and it is then injected into the two cavities 160.

The invention is not intended to be restricted to the details of the above described embodiments. The gas introduction device may be arranged in the nozzle of the injection moulding machine. When in the cylinder head, the device can be placed on either side of the shut-off valve. Downstream of the valve protects the poppet valve from some of the pressure variations during the cycling of the machine. Upstream of the valve ensures that all the injected gas is introduced into the injection chamber.

Again the gas introduction device may be provided in the injection chamber.

In a further alternative, where the gas is introduced via a drilling in the plasticising screw, with the poppet valve provided at the nose of the plasticising screw. This alternative has the advantage of being able to introduce the gas to various portions of the injection chamber, by interrupting wind back and introducing a step of drawing back the screw for gas introduction followed by reapplication of back pressure.

The invention is not intended to be restricted to the use of carbon dioxide gas. For instance olefin gases, such as butane, may be used, as may inert gases such as argon. Further liquids, which are gaseous at the elevated temperatures involved in the injection moulding process, may be used. For instance, it is anticipated that water may be able to be used. No tests have been carried out in respect of water.

Figure 6:
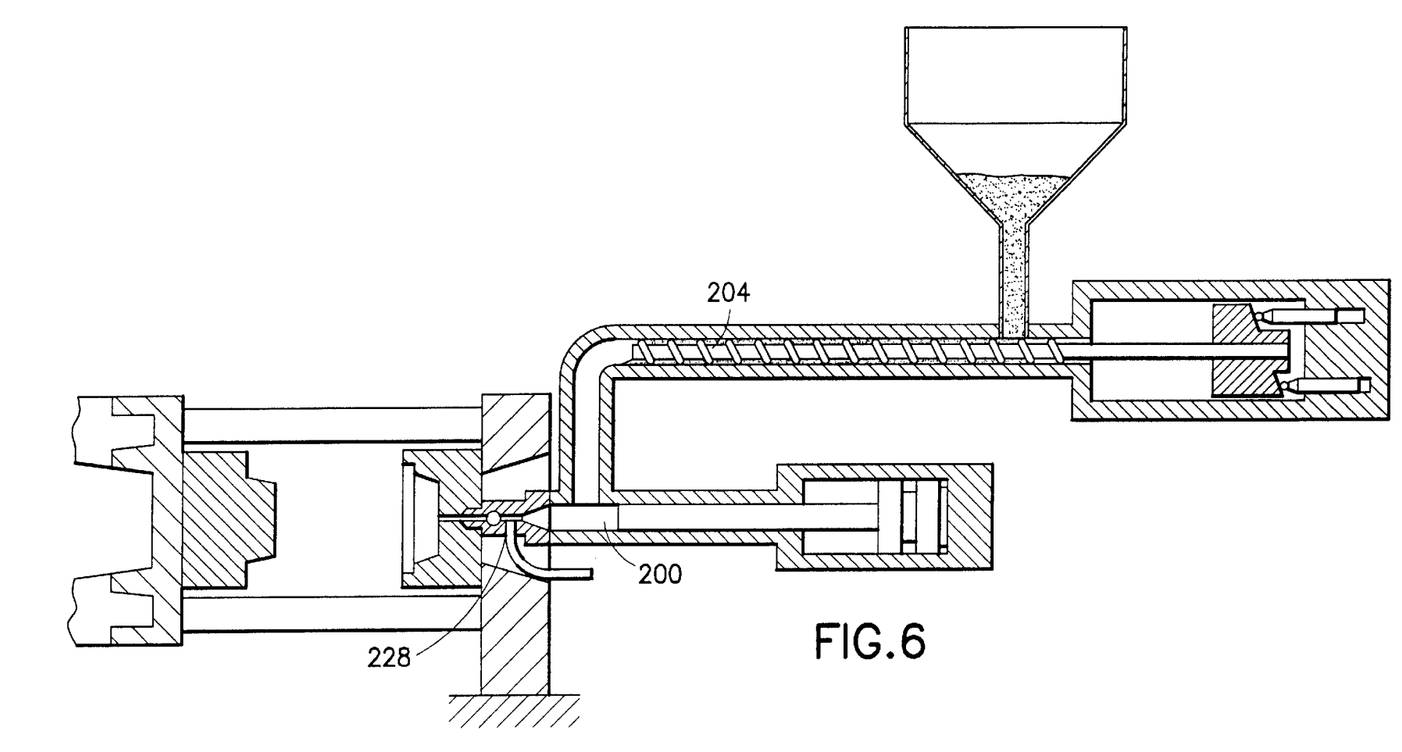
FIG. 6 is a view similar to FIG. 1 of a shooting pot injection moulding machine adapted to perform the method of the invention.

Further, the invention is not intended to be restricted to use with reciprocating screw injection moulding machines. FIG. 6 shows an injection moulding machine having a non-reciprocating plasticising screw 204 feeding melt to an accumulator or shooting pot 200 with an injection chamber 203. This is provided with a gas introduction device 228 activated for gas introduction to the shooting pot in like manner to introduction to the cylinder head of the machine of FIG. 1.

What is claimed is:

1. A method of adding gas to molten plastics material during each cycle of an injection moulding machine with an internal space limited by a piston, the method consisting in the steps of:

introducing gas into the internal space in front of the piston on backwards movement of the piston, upstream of the point of injection of molten plastics material, feeding molten plastics material to the space, and applying injection pressure to the internal space via the piston for expulsion therefrom of the molten plastics material with the added gas and its injection into a moulding cavity.

2. A method as claimed in claim 1, wherein the gas is of a substance which is gaseous at ambient pressure and temperature.

3. A method as claimed in claim 2, wherein the gas is carbon dioxide.

4. A method as claimed in claim 1, wherein the gas is a substance which is liquid at ambient pressure and temperature.

5. A method as claimed in claim 1, wherein the injection moulding machine has a plasticising screw which is not adapted to reciprocate and a shooting pot having an injection piston adapted to reciprocate in an injection chamber, and wherein the gas is introduced into the injection chamber during each cycle of the machine.

6. A method as claimed in claim 5, wherein the injection pressure in the internal space in front of the piston is reduced after injection to a holding pressure before the mould cavity is opened and wherein the pressure in the injection chamber is reduced below the holding pressure for introduction of the gas into the injection chamber.

7. A method as claimed in claim 5, wherein the gas is at elevated pressure and on introduction drives the injection piston back by a controlled amount due to the elevated pressure, whereby a controlled amount of gas is introduced into the injection chamber.

8. A method as claimed in claim 7, wherein the elevated pressure is a pressure at which the gas is stored or a lower pressure to which the gas is reduced by a regulator for introduction.

9. A method as claimed in claim 5, wherein the gas is at elevated pressure and the injection piston is drawn back by a controlled amount, by a mechanism of the machine for reciprocating the injection piston, whereby a controlled amount of gas is introduced into the injection chamber.

10. A method as claimed in claim 9, wherein the elevated pressure is a pressure lower than that at which the gas is stored and to which the gas is reduced by a regulator for introduction.

11. A method as claimed in claim 9, wherein the elevated pressure is a pressure lower than that at which the gas is stored and to which the gas is reduced by a regulator for introduction.

12. A method according claim 5, wherein the stroke by which the injection piston is driven or drawn back is at least partially taken up again after gas introduction by application of back pressure during feeding of molten plastics into the injection chamber.

13. A method according claim 5, wherein the gas is introduced directly into the injection chamber to the side of a cylinder head of the injection chamber remote from the moulding cavity.

14. A method as claimed in claim 13, wherein the cylinder head has a shut-off valve and wherein this valve is closed during gas introduction.

15. A method as claimed in claim 13, wherein the molten plastics material with the added gas is mixed by passage through a mixer at the cylinder head on the nozzle or in the mould tool.

16. A method as claimed in claim 13, wherein the gas is introduced through a non-return poppet valve, opening into the injection chamber, or the cylinder head, or the nozzle, or a flow channel in a mould tool, and a control valve between the poppet valve and a source of gas.

17. A method as claimed in claim 5, wherein the gas is introduced to the injection space via a cylinder head of the injection chamber or a nozzle between the cylinder head and a mould tool incorporating the moulding cavity.

18. A method as claimed in claim 17, wherein the gas is introduced through a controllable inlet valve, opening into the injection chamber, or the cylinder head, or the nozzle, or a flow channel in a mould tool.

19. A method as claimed in claim 18, wherein the controllable inlet valve obturates the cylinder head or the nozzle or an flow channel in a mould tool when open.

20. A method as claimed in claim 5, wherein the gas is introduced to the injection space via a flow channel in a mould tool incorporating the moulding cavity.

21. A method as claimed in claim 20, wherein the mould tool has a mechanical shut-off gate and the gate is closed during gas introduction.

22. A method as claimed in claim 1, wherein the injection moulding machine has a plasticising screw which is adapted to reciprocate in an injection chamber, and wherein the gas is introduced into the injection chamber during each cycle of the machine.

23. A method as claimed in claim 22, wherein the injection pressure in the internal space in front of the piston is reduced after injection to a holding pressure before the mould cavity is opened and wherein the pressure in the injection chamber is reduced below the holding pressure for introduction of the gas into the injection chamber.

24. A method as claimed in claim 22, wherein the gas is at elevated pressure and on introduction drives the plasticising screw back by a controlled amount due to the elevated pressure, whereby a controlled amount of gas is introduced into the injection chamber.

25. A method as claimed in claim 24, wherein the elevated pressure is a pressure at which the gas is stored or a lower pressure to which the gas is reduced by a regulator for introduction.

26. A method as claimed in claim 22, wherein the gas is at elevated pressure and the plasticising screw is drawn back by a controlled amount, by a mechanism of the machine for reciprocating the plasticising screw, whereby a controlled amount of gas is introduced into the injection chamber.

27. A method as claimed in claim 26, wherein the stroke by which the plasticising screw is driven or drawn back is at least partially taken up again after gas introduction by application of back pressure during feeding of molten plastics into the injection chamber.

28. A method as claimed in claim 22, wherein the gas is introduced directly into the injection chamber to the side of a cylinder head of the injection chamber remote from the moulding cavity.

29. A method as claimed in claim 28, wherein the cylinder head has a shut-off valve and wherein this valve is closed during gas introduction.

30. A method as claimed in claim 28, wherein the molten plastics material with the added gas is mixed by passage through a mixer at the cylinder head or the nozzle or in the mould tool.

31. A method as claimed in claim 28, wherein the gas is introduced through a non-return poppet valve, opening into the injection chamber, or the cylinder head, or the nozzle, or a flow channel in a mould tool, and a control valve between the poppet valve and a source of gas.

32. A method as claimed in claim 22, wherein the gas is introduced to the injection space via a cylinder head of the injection chamber or a nozzle between the cylinder head and a mould tool incorporating the moulding cavity.

33. A method as claimed in claim 32, wherein the gas is introduced through a controllable inlet valve, opening into the injection chamber, or the cylinder head, or the nozzle, or a flow channel in a mould tool.

34. A method as claimed in claim 33, wherein the controllable inlet valve obturates the cylinder head or the nozzle or an flow channel in a mould tool when open.

35. A method as claimed in claim 22, wherein the gas is introduced to the injection space via a flow channel in a mould tool incorporating the moulding cavity.

36. A method as claimed in claim 35, wherein the mould tool has a mechanical shut-off gate and the gate is closed during gas introduction.

37. A method as claimed in claim 1, wherein the gas is introduced during or subsequent to decompression or suckback, following injection and application of holding pressure where applied.

* * * * *